(12) United States Patent
Nk

(10) Patent No.: US 11,663,240 B2
(45) Date of Patent: May 30, 2023

(54) CATEGORIZATION USING ORGANIZATIONAL HIERARCHY

(71) Applicant: AirWatch LLC, Atlanta, GA (US)

(72) Inventor: Ramanandan Nk, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 305 days.

(21) Appl. No.: 16/431,036

(22) Filed: Jun. 4, 2019

(65) Prior Publication Data

US 2019/0286640 A1    Sep. 19, 2019

Related U.S. Application Data

(63) Continuation of application No. 15/485,482, filed on Apr. 12, 2017, now Pat. No. 10,372,732.

(51) Int. Cl.
| | |
|---|---|
| *G06F 16/84* | (2019.01) |
| *G06F 16/28* | (2019.01) |
| *G06F 16/21* | (2019.01) |
| *G06F 16/901* | (2019.01) |
| *G06F 16/9038* | (2019.01) |
| *G06Q 10/067* | (2023.01) |
| *G06Q 10/105* | (2023.01) |
| *G06F 21/45* | (2013.01) |
| *G06Q 50/00* | (2012.01) |

(52) U.S. Cl.
CPC ......... *G06F 16/285* (2019.01); *G06F 16/211* (2019.01); *G06F 16/84* (2019.01); *G06F 16/9024* (2019.01); *G06F 16/9038* (2019.01); *G06F 21/45* (2013.01); *G06Q 10/067* (2013.01); *G06Q 10/105* (2013.01); *G06F 2221/2145* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,002,872 B2 | 4/2015 | Jose et al. | |
| 9,674,210 B1* | 6/2017 | Oprea | H04L 63/0272 |
| 2009/0172101 A1* | 7/2009 | Arthursson | G06F 3/0486 |
| | | | 709/205 |
| 2009/0276398 A1 | 11/2009 | Naganuma et al. | |
| 2010/0174991 A1 | 7/2010 | Andersen et al. | |
| 2010/0223067 A1* | 9/2010 | Giles | G06Q 10/06 |
| | | | 705/2 |
| 2011/0161846 A1* | 6/2011 | Dutta | G06F 8/70 |
| | | | 715/763 |
| 2013/0111545 A1* | 5/2013 | Sharma | H04L 63/10 |
| | | | 726/1 |

(Continued)

*Primary Examiner* — Thu N Nguyen
(74) *Attorney, Agent, or Firm* — Thomas Horstemeyer, LLP

(57) ABSTRACT

Disclosed are various examples for categorization using an organizational hierarchy. In some examples, a client device receives an enterprise map comprising a plurality of user identifiers, each being associated with a hierarchy level of an enterprise hierarchy. Enterprise content is received. The enterprise content includes data associated with a user identifier from the enterprise map. The enterprise content is associated with a category based on a hierarchy level of the user identifier. A user interface is generated to include the enterprise content and a visual design element based on the category.

20 Claims, 8 Drawing Sheets

(56) References Cited

U.S. PATENT DOCUMENTS

| | | | |
|---|---|---|---|
| 2013/0113820 A1* | 5/2013 | Molesky | G06T 11/00 |
| | | | 345/592 |
| 2013/0262320 A1* | 10/2013 | Makanawala | G06Q 30/016 |
| | | | 705/304 |
| 2016/0055151 A1 | 2/2016 | Kamishima | |
| 2017/0060906 A1* | 3/2017 | Born | G06F 16/21 |

* cited by examiner

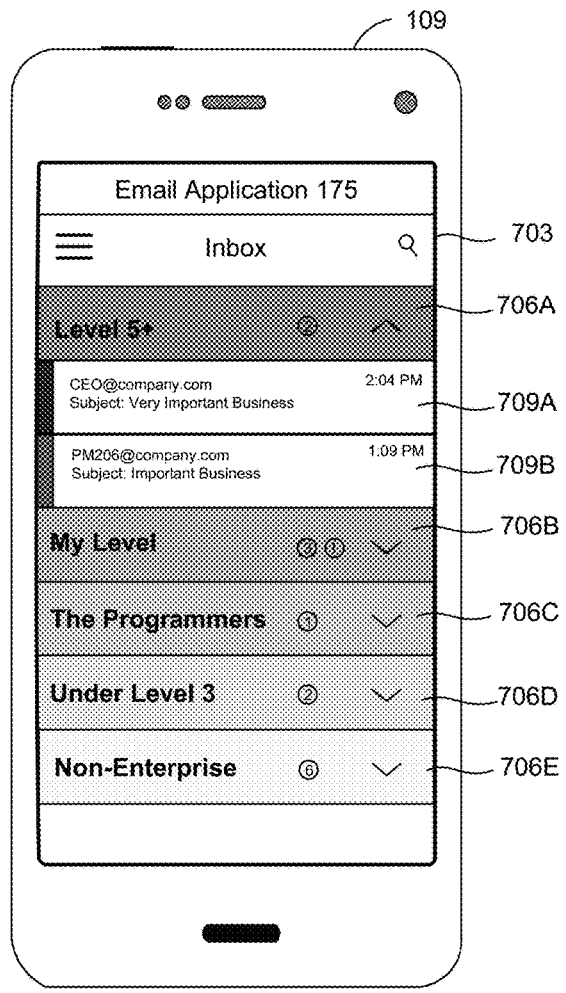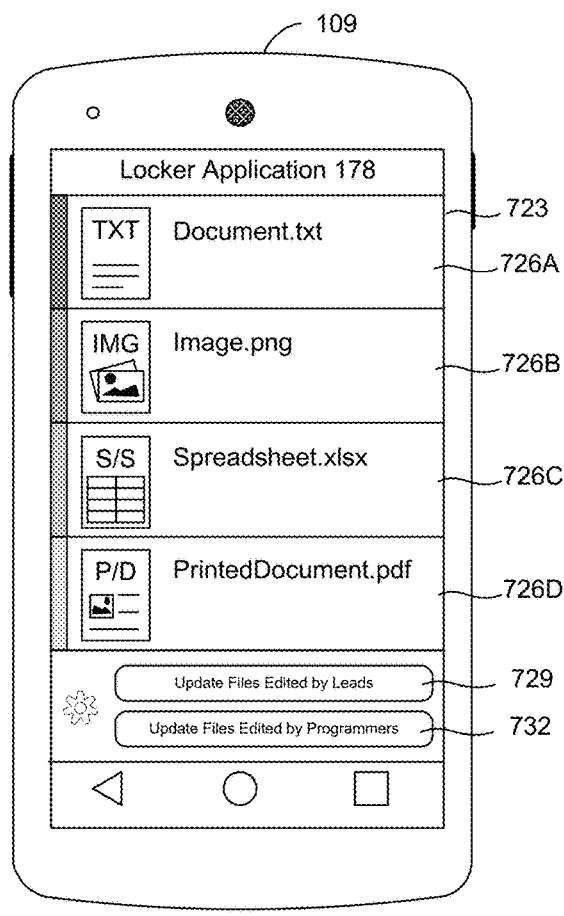
FIG. 7A
FIG. 7B

CATEGORIZATION USING ORGANIZATIONAL HIERARCHY

CROSS-REFERENCE TO RELATED APPLICATIONS

This application claims priority to and the benefit of U.S. application Ser. No. 15/485,482, filed Apr. 12, 2017 and entitled "Categorization Using Organizational Hierarchy," which is incorporated herein by reference in its entirety.

BACKGROUND

A management service can provide an enterprise with access to email, corporate documents, social media posts, and other enterprise content to prevent theft, data loss, and unauthorized access. The user may receive such emails, corporate documents, social media posts, and other enterprise content from a variety of different users associated with the enterprise. The enterprise content can be difficult to manage. Among the emails, documents, and social media posts, it can be difficult for the user to recognize which content is most important or relevant to them. Emails may be arranged to show the most recent emails, and a user may see recent emails from low ranking users in the enterprise, while inadvertently overlooking content from a direct supervisor, or content from the highest ranking users. A user may have to manually organize emails or other content when received.

The concept of flagging emails and other content as urgent or high priority arose as a potential solution to this problem. However, the recipient is not in control of what is flagged as urgent or high priority. Some senders may decline to use urgent or high priority flags for any message. Other senders may over-utilize such flags, rendering them meaningless to the recipient. Moreover, what seems urgent for the sender may not be urgent for the recipient. In some situations content may be important to the recipient regardless of whether the sender used such an urgent or high priority flag. Accordingly, even when email and other content is flagged as urgent or high priority, users can nevertheless become frustrated when content that is most important or relevant to them is not flagged by the sender.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 7A-C are drawings illustrating functionality implemented by components of the networked environment and rendered on the client device.

DETAILED DESCRIPTION

The present disclosure relates to categorization using an organizational hierarchy. A management service can provide an enterprise with access to email, corporate documents, social media, and other enterprise content to prevent theft, data loss, and unauthorized access. However, the quantity of enterprise content can be difficult to manage. Among the emails, documents, posts, and other content, it can be difficult for users to recognize the content that is most important or relevant to them. Emails may be arranged to show the most recent emails, and a user may see recent emails from low ranking users in the enterprise, while inadvertently overlooking content from a direct supervisor, or content from the highest ranking users. A user may have to manually organize emails or other content when received. This situation can frustrate users.

However, examples described include a management service having mechanisms capable of categorization using an organizational hierarchy. According to some examples described, a management service can obtain user identifiers for users associated with an enterprise. In some cases, the user identifiers can be obtained from a directory service. The directory service can be part of the management service, or can be separate from the management service. The management service can transmit a request for subordinate data for each user to the directory service. The subordinate data can identify users that are directly subordinate to each user. In some cases, a user can have no users that are directly subordinate. The request for subordinate data can include a user identifier for each user. The management service can receive data corresponding to the users from the directory service and generate a hierarchy that links the users. The hierarchy can be generated using the subordinate data. The management service can generate an enterprise map using the hierarchy that can include a user identifier and a level from the hierarchy for each user. The management service can send the enterprise map to a client device. The client device can execute an application that generates a user interface organized using the enterprise map.

According to additional examples, the management service can receive the user identifiers in response to a request to the directory service to identify the users that are associated with the enterprise. In some cases, the enterprise map can include an email address for each user, which can be received from the directory service in response to the request. In some examples, the application can obtain a client user identifier for the client device and assign a client user level identified from the enterprise map using the client user identifier.

Figure 1:
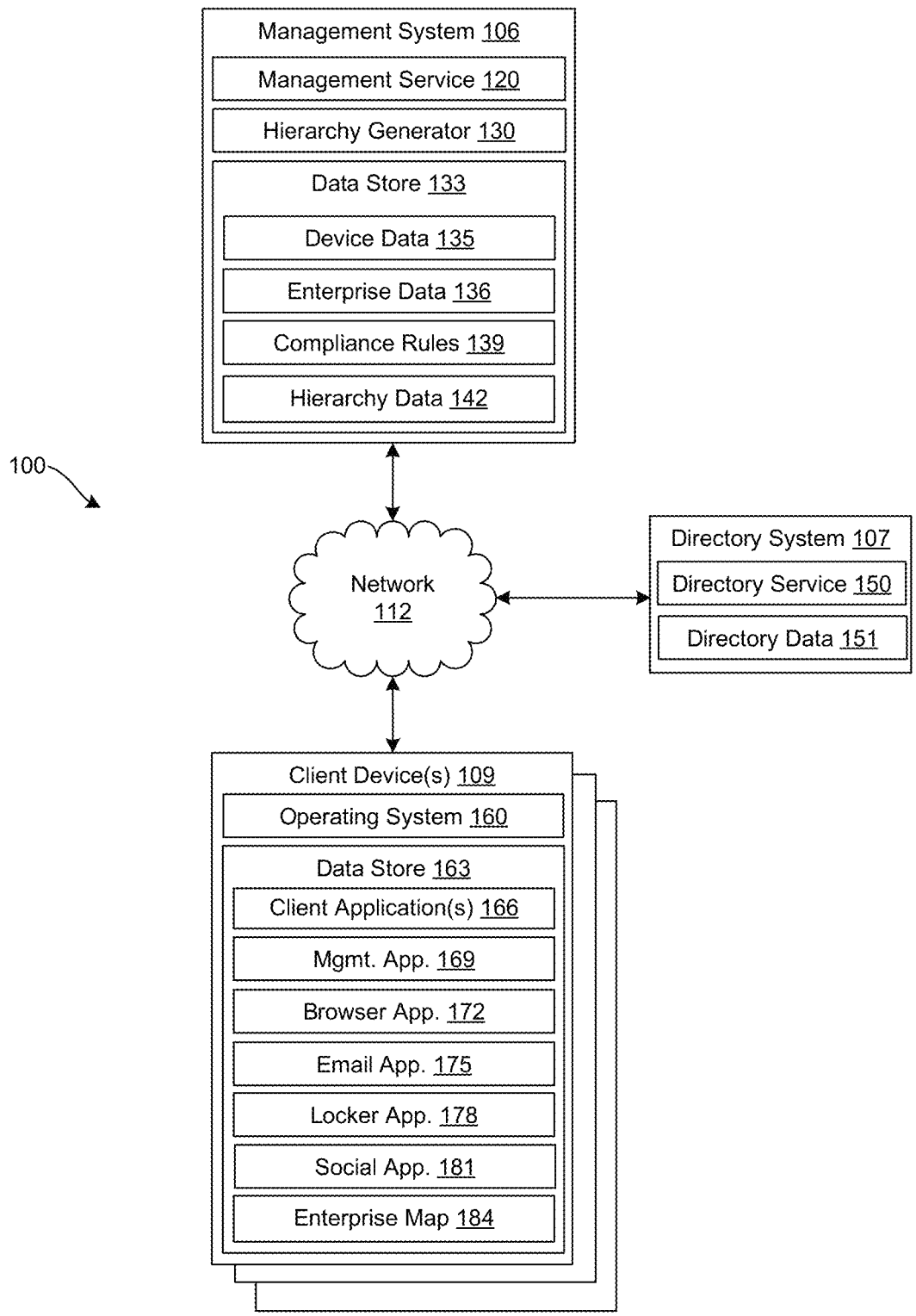
FIG. 1 is a drawing of an example of a networked environment, including a management system and a client device.

With reference to FIG. 1, shown is an example of a networked environment 100. The networked environment 100 can include a management system 106, a directory system 107, and client device(s) 109 in communication with one another over a network 112. The management system 106 can provide an enterprise with access to email, corporate documents, social media, and other enterprise content, as well as manage.

The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks.

The management system 106 can include a server computer or any other system providing computing capability. Alternatively, the management system 106 can include a plurality of computing devices that are arranged, for example, in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to in the singular. Even though the management system 106 is referred to in the singular, it is understood that a plurality of management systems 106 can be employed in the various arrangements as described above. As the management system 106 communicates with the client device 109 remotely over the network 112, the management system 106 can be described as a remote management system 106 or a collection of one or more remote computing devices.

The management system 106 can execute a management service 120 to oversee management of the client devices 109. The components executed on the management system 106 can include, for example, the management service 120, a hierarchy generator 130, as well as other applications, services, processes, systems, engines, or functionality not discussed in detail. In some embodiments, an enterprise, such as one or more companies or other organizations, can operate the management service 120 to oversee or manage the operation of the client devices 109 of its employees, contractors, customers, students, or other users having user accounts with the enterprise. An enterprise can be any customer of the management service 120, and such an enterprise can also be referred to as an organization. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management service 120 can have a command queue storing at least one action to perform on a particular client device 109 upon check-in of the client device 109. For instance, the management application 169 can cause the client device 109 to check-in with the management service 120, identify an action in the command queue, and perform the action. An action in the command queue can direct the installation of a profile, or the execution of a command or other actions to install software components or implement policies.

Also, the management service 120 can request that the client device 109 check in using a notification service like APPLE® Push Notification Service (APNS), GOOGLE® Cloud Messaging (GCM), or WINDOWS® Push Notification Services (WNS). For example, the management service 120 can transmit a request to the notification service requesting that the client device 109 check-in. The notification service can push or otherwise route a notification to the client device 109. Once the notification is received, the management application 169 can cause the client device 109 to check-in with the management service 120. As described above, the management application 169 can determine whether a command queue provided by the management service 120 for the respective client device 109 contains any commands or resources for the client device 109, and, if so, can cause the commands or resources to be downloaded and/or implemented on the client device 109.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance APIs provided can include Representational State Transfer (REST) APIs, Identity Services Engine (ISE) APIs, and other APIs.

The data store 133 can include memory of the management system 106, mass storage resources of the management system 106, or any other storage resources on which data can be stored and accessed by the management system 106. The data stored in the data store 133 can include, for example, management data including device data 135, enterprise data 136, compliance rules 139, and hierarchy data 142, as well as other data.

Generally, device data 135 can include data associated with a configuration of a client device 109 enrolled or managed by the management service 120 as well as an identifier of the client device 109. The identifier can be a serial number, media access control (MAC) address, other network address, or other device identifier. In addition, the device data 135 can include an enrollment status indicating whether a client device 109 has been enrolled with the management service 120. In one example, a client device 109 designated as "enrolled" can be permitted to access the enterprise data 136 while a client device 109 designated as "not enrolled," or having no designation, can be denied access to the enterprise data 136.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to user groups. An administrator can specify one or more of the client devices 109 as belonging to a user group. User groups can be created by an administrator of the management service 120 such that a batch of client devices 109 can be configured according to common settings. For instance, an enterprise can create a user group for the marketing department and the sales department, where the client devices 109 in the marketing department are configured differently from the client devices 109 in the sales department. Enterprise data 136 can include email, corporate documents, social media, messages, and other enterprise content or communications. The management service 120 can be employed to manage and control access to the enterprise data 136 associated with an enterprise. The management service 120 can provide systems and applications to allow such access based on user accounts, user groups, device data 135, compliance rules 139, hierarchy data 142, and other information.

Compliance rules 139 can include, for example, configurable criteria that must be satisfied for an enrolled one of the client devices 109 to be "in compliance" with the management service 120. The compliance rules 139 can be based on a number of factors including geographical location of the client device 109, activation status, enrollment status, authentication data including authentication data obtained by a device registration system, time, and date, and network properties, among other factors. The compliance rules 139 can also be determined based on a user profile associated with a user. The user profile can be identified by obtaining authentication data associated with the client device 109. The user profile can be associated with compliance rules 139 that are further determined based on time, date, geographical location and network properties detected by the client device 109. The user profile can be further be associated with a user group, and compliance rules 139 can be determined in view of the user group.

Compliance rules 139 can include predefined constraints that must be met in order for the management service 120, or other applications, to permit access to the enterprise data 136 or other features of the client device 109. In some examples, the management service 120 communicates with a management application or another client application 166 executable on the client device 109 to determine whether states exist on the client device 109 that do not satisfy one or more compliance rules 139. Some of these states can include, for example, a virus or malware being detected on the client device 109, installation or execution of a blacklisted client application 166, or a client device 109 being "rooted" or "jailbroken," where root access is provided to a user of the client device 109. Additional states can include the presence of particular files, questionable device configurations, vulnerable versions of client applications 166, or other vulnerability, as can be appreciated. In other examples, the compliance rules 139 can be configured in the management service 120 as specified by an administrator.

In some embodiments, an enterprise can operate the management service 120 to oversee or manage the operation of the client devices 109 of its employees, contractors, customers, students, or other users having user accounts with the enterprise. The management service 120 can remotely configure the client device 109 by interacting with a management application 169 or another client application 166 executed on the client device 109.

The management service 120 can transmit various software components to the client device 109 which can then be installed or configured by the management application 169. Such software components can include, for example, additional client applications 166, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or disabled during a certain time period or when the client device 109 is physically located at a particular location. Such policies can be implemented by the management application 169.

In some examples, the management service 120 can provide a social media network that is accessible by users associated with the enterprise. The social media network can allow users to submit posts to the social media network. The management service 120 can provide access to a list of such posts in the social media network. Each post in the list of posts can include a user identifier or a name that identifies the user that submitted the post. The social media network can also allow users associated with the enterprise to submit comments or replies to posts. Each comment can include a user identifier or a name that identifies a user that submitted the comment. The management service 120 can provide access to the social media network through a network site, a web application, or client applications 166 on the client device 109, such as a social application 181. A user interface of the network site, web application or client applications 166 can organize and display posts and comments in the social media network using the hierarchy data 142 and/or the enterprise map 184. For example, a user identifier or a name associated with a particular post or comment can be compared to the enterprise map 184 to identify a corresponding level and other information associated with the user identifier in the enterprise map 184. The post or comment can be requested, updated, hidden, shown, identified, categorized, promoted, or demoted in the social media network based on the information in the enterprise map 184.

The management service 120 can also provide access to email and other messages or messaging services through a network site, a web application, or client applications 166 on the client device 109 such as the email application 175. A user interface of the network site, web application or client applications 166 can organize and display email and other messages using the hierarchy data 142 and/or the enterprise map 184. For example, an email message can be received from a particular email address. The email address can be compared to the enterprise map 184 to identify a corresponding level and other information associated with the email address in the enterprise map 184. A messaging service, such as a personal or group messaging service, can receive a message that is associated with a user identifier or a name. A user identifier or a name can be compared to the enterprise map 184 to identify a corresponding level and other information. Accordingly, email messages and other messages can be requested, updated, hidden, shown, identified, categorized, promoted, or demoted based on the enterprise map 184. While an email application is described, a personal messaging application or instant messaging application that receives messages can also be provided by the management service 120.

The management service 120 can also provide access to shared files and other enterprise data 136 through a network site, a web application, or client applications 166 on the client device 109, such as a locker application 178. A user interface of the network site, web application or client applications 166 can organize and display the shared files and other enterprise data 136 using the hierarchy data 142 and/or the enterprise map 184. For example, a shared file can be received or updated by a particular user. A name or a user identifier associated with the shared file or an update to the shared file can be compared to the enterprise map 184 to identify a corresponding level and other information. Accordingly, shared files and other enterprise data 136 can be requested, updated, hidden, shown, identified, categorized, promoted, or demoted based on the enterprise map 184.

The management service 120 can also provide access to a calendar that can provide access to appointments, events, and other calendar items through a network site, a web application, or client applications 166 on the client device 109, such as a calendar application. Each calendar item can include a user identifier or a name that identifies a user that submitted the calendar item. A user interface of the network site can organize and display calendar items using the hierarchy data 142 and/or the enterprise map 184. For example, a user identifier or a name associated with a particular calendar item can be compared to the enterprise map 184 to identify a corresponding level and other information associated with the user identifier in the enterprise map 184. Accordingly, appointments, events, and other calendar items can be requested, updated, hidden, shown, identified, categorized, promoted, or demoted (e.g., in a list of calendar items for that day, week, month, etc.) based on the enterprise map 184.

The management service 120 can also provide access to a list of contacts application that can provide access to a list of contacts through a network site, a web application, or client applications 166 on the client device 109, such as a contacts application. Each contact can include a user identifier or a name that identifies the contact. A user interface of the network site can organize and display contacts using the hierarchy data 142 and/or the enterprise map 184. For example, a user identifier or a name associated with a particular contact can be compared to the enterprise map 184 to identify a corresponding level and other information associated with the user identifier in the enterprise map 184. Accordingly, appointments, events, and other calendar items can be requested, updated, hidden, shown, identified, categorized, promoted, or demoted e.g., in the contact list) based on the enterprise map 184.

A directory system 107 can include a server computer or any other system providing computing capability. Alternatively, the directory system 107 can include a plurality of computing devices that are arranged, for example, in one or more server banks, computer banks, or other arrangements. The directory system 107 can include a grid computing resource or any other distributed computing arrangement. The computing devices can be located in a single installation or can be distributed among many different geographical locations. The directory system 107 can also include or be operated as one or more virtualized computer instances. For purposes of convenience, the directory system 107 is referred to in the singular. In some cases the directory system 107 can be a part of the management system 106, and in other cases the directory system 107 can be separate from the management system 106. The directory system 107 can execute a directory service 150. The directory service 150 can provide functionality using APIs. For instance APIs provided by the directory service 150 can include REST APIs, ISE APIs, and other APIs. To this end, an API of the directory service 150 can provide directory data 151 based on a request that can be sent from the management service 120. APIs or API calls can be provided for other functionalities of the directory service 150 as discussed.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 160 that can perform functionalities and execute applications. The operating system 160 can be stored in a data store 163 that also includes client applications 166, a management application 169, a browser application 172, an email application 175, a locker application 178, a social application 181, enterprise map 184, and other data. Client applications 166 can include any of the applications discussed, as well as device management applications, enterprise applications, word processors, spreadsheet applications, media player applications, or other applications.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another.

The operating system 160 can be configured to execute various client applications 166, such as the management application 169, the browser application 172, the email application 175, the locker application 178, the social application 181, or another application. The operating system 160 and some client applications 166 can access network content including web applications that can provide services much like the various applications discussed. Such network content and web applications can be served up by the management system 106 or other servers, thereby rendering a user interface on a display of the client device 109, such as a liquid crystal display (LCD), organic light emitting diode (OLED) display, touch-screen display, or other type of display device.

The management application 169 can be executed in the client device 109 to perform actions on the client device 109. For example, the management application 169 can cause the client device 109 to check-in with the management service 120, identify an action in the command queue, and perform the action. An action can be the installation of a profile, or the execution of a command or other actions to install software components or implement policies. In some cases, the management application 169 can cause a check-in of the client device 109 periodically, on a schedule, or upon an event such as entering a physical location, changing a state of the client device 109, installing an application, or receiving a notification on the client device 109. In one example, the contents of the command queue can include a command that the management application 169 causes to be executed on the client device 109. In another example, the contents of the command queue can include a resource or a client application 166 that the management application 169 causes to be installed on the client device 109, which the client device 109 may access through a specified uniform resource locator (URL).

The browser application 172 can be executed in the client device 109 render a user interface for a network page, an application screen, or other interface. The client device 109 can also access web applications through the network 112 using the browser application 172 which can render a user interface associated with a web application or network site on the client device 109.

The email application 175 can be executed in the client device 109 to provide access to email messages. A user interface of the email application 175 can organize and display email messages using the hierarchy data 142 and/or the enterprise map 184. For example, an email message can be received from a particular email address. The email address can be considered a user identifier of a user having an account with the enterprise. The email address can also be compared to the enterprise map 184 to identify a corresponding level and other information associated with the email address in the enterprise map 184. The email application 175 can request, update, hide, show, identify, categorize, promote, or demote shared files and other enterprise data 136 in the user interface based on the information in the enterprise map 184.

The locker application 178 can be executed in the client device 109 to provide access to shared files and other enterprise data 136. A shared file can be received or updated by a particular user. A user interface of the locker application 178 can organize and display posts and comments in the social media network using the hierarchy data 142 and/or the enterprise map 184. For example, a name or a user identifier associated with the shared file or an update to the shared file can be compared to the enterprise map 184 to identify a corresponding level and other information. The locker application 178 can request, update, hide, show, identify, categorize, promote, or demote shared files and other enterprise data 136 in the user interface based on the information in the enterprise map 184.

The social application 181 can be executed in the client device 109 to provide access to a list of posts in a social media network. The social media network can be one provided by the management service 120 or another source. Each post in the social media network can include a user identifier or a name that identifies a user that submitted the post. The social media network can also allow users associated with the enterprise to submit comments or replies to posts in the social media network. Each comment can include a user identifier or a name that identifies a user that submitted the comment. A user interface of the social application 181 can organize and display posts and comments in the social media network using the hierarchy data 142 and/or the enterprise map 184. For example, a user identifier or a name associated with a particular post or comment can be compared to the enterprise map 184 to identify a corresponding level and other information associated with the user identifier in the enterprise map 184. The social application 181 can request, update, hide, show, identify, categorize, promote, or demote a post or comment in the user interface based on the information in the enterprise map 184.

Client applications 166 can also include a calendar application that can provide access to appointments, events, and other calendar items in a calendar. Each calendar item can include a user identifier or a name that identifies a user that submitted the calendar item. A user interface of the calendar application can organize and display calendar items using the hierarchy data 142 and/or the enterprise map 184. For example, a user identifier or a name associated with a particular calendar item can be compared to the enterprise map 184 to identify a corresponding level and other information associated with the user identifier in the enterprise map 184. The calendar application can request, update, hide, show, identify, categorize, promote, or demote a calendar item in the user interface (e.g., in a list of calendar items for that day, week, month, etc.) based on the information in the enterprise map 184.

Client applications 166 can also include a contacts application that can provide access to a list of contacts. Each contact can include a user identifier or a name that identifies the contact. A user interface of the contact list can organize and display contacts using the hierarchy data 142 and/or the enterprise map 184. For example, a user identifier or a name associated with a particular contact can be compared to the enterprise map 184 to identify a corresponding level and other information associated with the user identifier in the enterprise map 184. The contact application can request, update, hide, show, identify, categorize, promote, or demote a contact (e.g., in the contact list) based on the information in the enterprise map 184.

Figure 2:
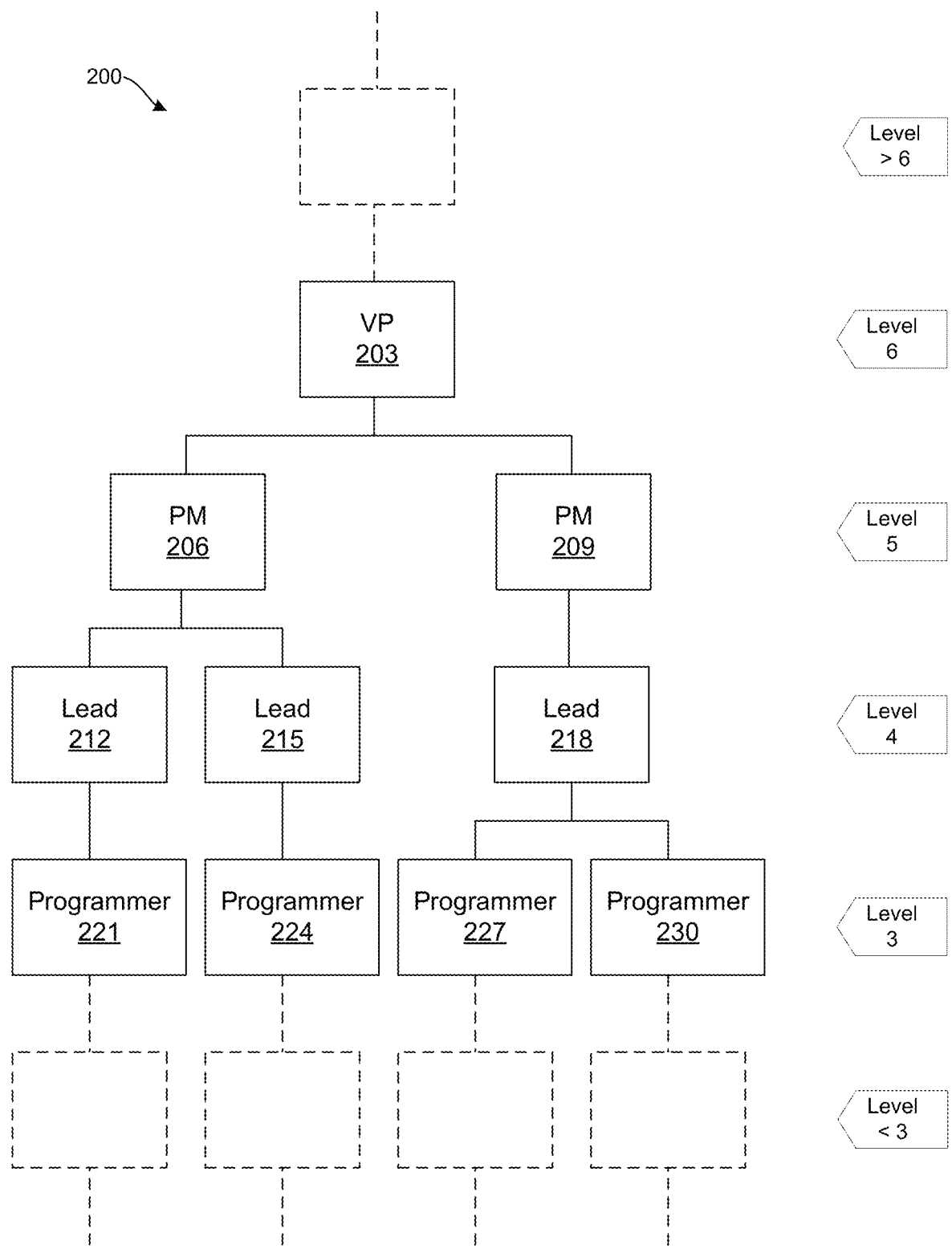
FIG. 2 is a drawing of an example of a hierarchy.

Turning now to FIG. 2, shown is a hierarchy 200. The hierarchy 200 can be associated with an organization or an enterprise. The hierarchy 200 can link the users having an account with the enterprise. In one example, the hierarchy 200 can include a vice president 203. The vice president 203 can manage project managers 206 and 209, who can be considered direct subordinates of, or directly subordinate to, the vice president 203. The vice president 203 can be managed by another position that can be considered a direct superior of, or directly superior to, the vice president 203. Such a superior can include a president, a chief executive officer, a group such as a board of directors, or the individuals of the board of directors. The vice president 203 can be considered level six of the hierarchy 200. Those superior to the vice president 203 can be considered greater than level six.

Level five of the hierarchy 200 can be the project managers 206 and 209. While the project managers 206 and 209 are each described using a similar title of project manager, each could instead have a distinct title and nevertheless be considered level five, since they are each directly managed by the level six vice president 203. For example, while the programmers shown are all on level three, a programmer that is directly managed by the vice president 203 can be considered a level five user.

The project manager 206 can manage leads 212 and 215 who can be considered directly subordinate to the project manager 206. The leads 212 and 215 can also be considered subordinate to the vice president 203, but not directly subordinate to the vice president 203, because the project manager 206 can be linked between them in the hierarchy 200. The leads 212 and 215 can be in level four of the hierarchy 200. The level five project manager 209 can manage a lead 218 in level four.

The level four lead 212 can manage a programmer 221, who can be considered level three of the hierarchy 200 as being managed by a level four user. The level four lead 215 can manage a programmer 224, who can also be considered level three of the hierarchy 200 as being managed by a level four user. The level four lead 218 can manage programmers 227 and 230, who can also be considered level three users as being managed by a level four user. The hierarchy 200 can also include users that are managed by the level three programmers 221, 224, 227, and 230, who can be level two users, or under level three, and so on.

While the levels of the hierarchy 200 can be arranged such that subordinate users have a level that is lower than a superior user's level, the levels can also be arranged such that the highest ranking user in the hierarchy 200 has the lowest number. As an example, a president of a company can be level one and a vice president can be level two. Yet in further embodiments, the levels can be referred to with level identifiers that do not correspond to a numerical rank, such as a title, an alphanumeric string, or another string that can be used to identify a level in the hierarchy 200. The hierarchy data 142 can track the relative positions of such level identifiers. A total number of levels of the hierarchy 200 can be calculated as a maximum number of linked users from a user in the hierarchy 200 that has no superiors to another user in the hierarchy 200 that has no subordinates.

The hierarchy 200 can be generated using directory data 151 for users that are in an enterprise. For example, the management service 120 can manage an enterprise that has a number of users with user accounts. Information about the users can be stored in a data store of a directory system 107 that includes the directory data 151. The directory system 107 can utilize one or more directory service(s) 150 that can incorporate services including MICROSOFT® Active Directory, Lightweight Directory Access Protocol (LDAP), and VMWARE® Socialcast. In some cases, the directory system 107 can be maintained by the management service 120, and the directory service 150 can be part of the management service 120. In other cases, the directory system 107 can be maintained by the enterprise or another entity and the directory service 150 can be separate from the management service 120. The management service 120 can generate the hierarchy 200 using the directory data 151.

In some cases, the management service 120 can invoke an API provided by a directory service 150 in order to generate the hierarchy 200. For example, the management service 120 can invoke an API (e.g., GET /api/users) that identifies all users in a community or enterprise. The API can return data that identifies all users and can include email addresses, user identifiers, names, whether each user is listed as active, and other information. In other cases, the management service 120 can have a list of users that includes such information that is otherwise obtained from or provided by the enterprise. For a particular user, the management service 120 can invoke an API (e.g., GET /api/users/:user_id/employees) that identifies a list of users for whom the particular user is the manager. Such a list can be considered a list of users directly subordinate to the particular user. Alternatively, an API can be invoked that identifies a manager or a superior user for the particular user. The hierarchy 200 can be generated by repeating this for each user in the enterprise and integrating the information to link the users in a hierarchal structure. The hierarchy 200 can be updated periodically, on a schedule, upon an event, or on demand.

The hierarchy 200 can be saved or stored as hierarchy data 142 in the data store 133. The hierarchy data 142 can include the entire hierarchy 200. The hierarchy data 142 can also include data that identifies branches of the hierarchy that are associated with each user by tracing back a chain of users that are superior (e.g., directly superior and otherwise superior) to a particular user and identifying all users that are subordinate (e.g., directly subordinate and otherwise subordinate) to the particular user. For example, a branch associated with the lead 215 can have superiors including the project manager 206 and the vice president 203 and subordinates including the programmer 224. In another example, a branch associated with the project manager 206 can have superiors including the vice president 203 and can have subordinates including the lead 212, the lead 215, the programmer 221, and the programmer 224.

While this example describes employees of a company, other enterprises can include non-employees such as contractors and subcontractors on a project, independent doctors in a medical group, tenants of a building, students and teachers in an educational system, or other individuals and groups of individuals that can be defined in an organizational structure or hierarchy. In some cases, employees and non-employees can be part of a single hierarchy 200.

The hierarchy 200, as stored in hierarchy data 142, can be used to generate an enterprise map 184 that can be provided to the client device 109. While shown in the data store 163 of client device 109, the enterprise map 184 can also be stored in the data store 133 as hierarchy data 142. The enterprise map 184 can include all of the hierarchy data 142 or can be generated based on the hierarchy data 142. A total number of levels of the hierarchy 200 can be calculated as a maximum number of linked users from a user in the hierarchy 200 that has no superiors to another user in the hierarchy 200 that has no subordinates. Each level can be assigned a level or a level identifier.

The enterprise map 184 can include a table or a list of user identifiers. Each user identifier can be associated with a level from the hierarchy data 142. The level for a particular user can be found by searching the hierarchy data 142 for the user identifier of a particular user. In some cases the user identifier is an email address. In other cases, an email address can be identified along with another user identifier in the hierarchy data 142. The enterprise map 184 can include branch information by listing all users superior to and subordinate to each particular user in the enterprise map 184. In some cases, an enterprise map 184 can be generated for a particular client device 109 or a user associated with the particular client device 109, and can include only the branch information that identifies users in a particular branch for the user associated with the particular client device 109. In other examples, the enterprise map 184 can include branch information for all users in the enterprise map 184, or for none of the users in the enterprise map 184.

Figure 3:
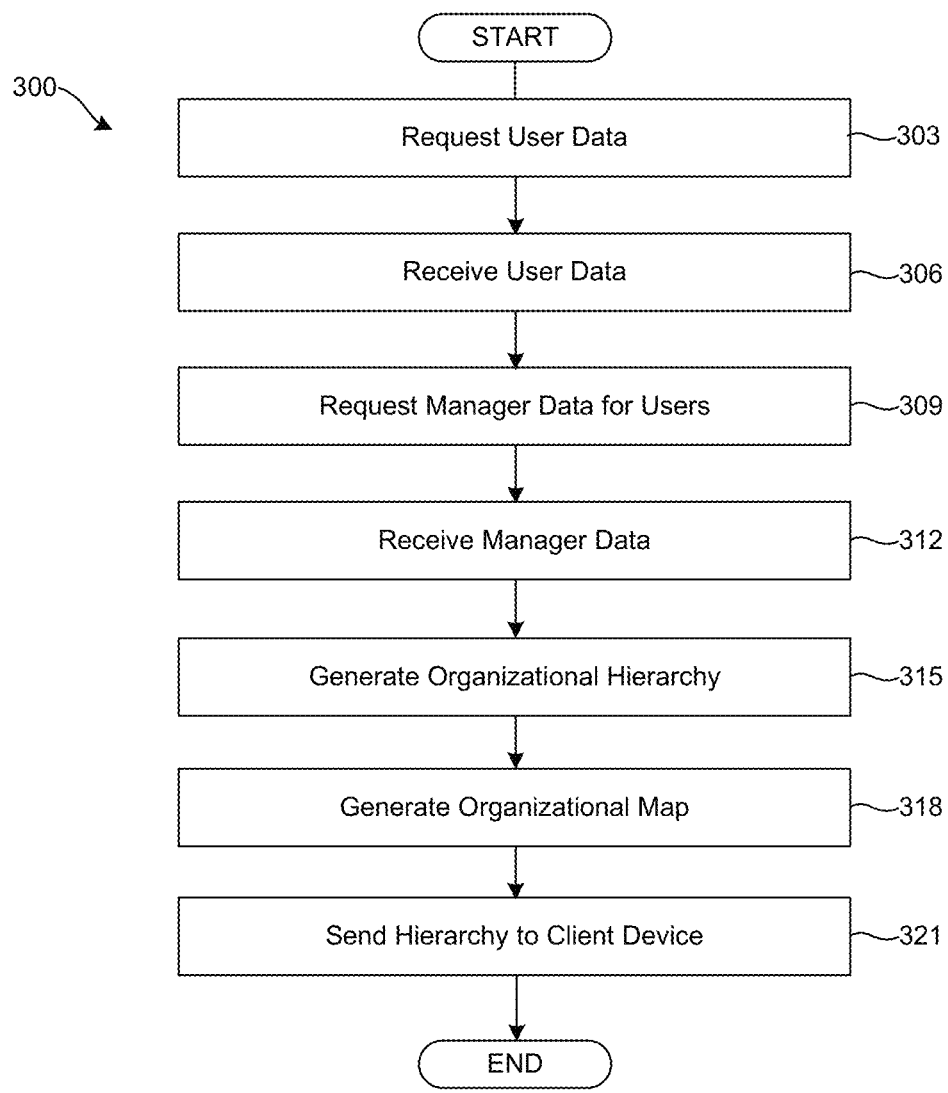
FIGS. 3-6 are flowcharts illustrating functionality implemented by components of the networked environment.

In FIG. 3, shown is an example flowchart 300 illustrating steps that can be performed by the management service 120. Starting with step 303, the management service 120 can request user data associated with an enterprise. The user data can include a list of users associated with an enterprise. In some cases, the management service 120 can query a directory service 150 such as MICROSOFT® Active Directory, LDAP, or VMWARE® Socialcast to request the list of users. In some cases, the directory service 150 can require credentials including an identifier of the enterprise, a username, a password, a PIN, biometrics, or other credentials before providing the user data. The management service 120 can authenticate with the directory service 150 using Security Assertion Markup Language (SAML), LDAP, token, or other forms of authentication. The management service 120 can invoke an API (e.g., GET /api/users) to request all users in a community or enterprise or a subset of users in the enterprise (e.g., active users). The request can in some examples include a unique identifier associated with the enterprise, which can be referred to as an enterprise identifier. Alternatively, the management service 120 can request a list of users by sending email or another message to an address associated with the enterprise.

In step 306, the management service 120 can receive the user data associated with the enterprise. For example, the directory service 150 can provide an API that returns the user data in response to the management service 120 invoking the API. In some cases, the management service 120 can request that the user data include a subset of users associated with the enterprise by invoking an API with a parameter that causes the API to return the requested user data for the subset of users. For example, the management service 120 can request user data for active users of the enterprise, or users corresponding to a particular role, type, user group, or status. The API can return the user data in response to the request from the management service 120. In some situations, the management service 120 can receive the user data through email or another message. Alternatively, a representative of the enterprise can upload the user data associated with the enterprise using a network site provided by the management service 120.

The user data can include user identifiers for each user associated with the enterprise. In some cases, an email address can be used as a user identifier for each user. In other cases, a user identifier can be a username, and an email address can be provided in addition to the user identifier. A device identifier or identifiers associated with each user can also be included in the user data.

In step 309, the management service 120 can request subordinate data from the directory service 150. For example, the management service 120 can invoke an API (e.g., GET /api/users/:user_id/employees) of the directory service 150 that identifies a list of subordinate users that are managed by, or are directly subordinate to, a particular user. Alternatively, an API can be invoked that identifies the manager(s) or a superior user(s) for a particular user. The hierarchy 200 can be generated by repeating this for each user associated with the enterprise or for a subset of the enterprise users. In some cases, the management service 120 can transmit a request that includes a list of users associated with the enterprise.

In step 312, the management service 120 can receive the subordinate data that is requested from the directory service 150. In one example, a management service 120 can transmit a request for a particular user, and the directory service 150 can return the list of subordinate users that are managed by the particular user. In another example, the management service 120 can transmit a request that includes a list of users associated with the enterprise, and the directory service 150 can return a respective list of subordinate users for each user in the list of users.

In step 315, the management service 120 can generate a hierarchy 200. The management service 120 can store the hierarchy 200 in the hierarchy data 142. The management service 120 can generate the hierarchy 200 using the subordinate data for each user in list of users associated with the enterprise. Because the subordinate data for all users can be obtained, the management service 120 can generate the hierarchy 200 by identifying, for each user, a corresponding list of directly subordinate users and at least one user that is directly superior to the particular user. Accordingly, the management service 120 can generate a hierarchal relationship that links all users associated with the enterprise, or a subset of the users associated with the enterprise in a branching structure that embodies the hierarchy 200.

In step 318, the management service 120 can generate an enterprise map 184. For example, the management service 120 can determine a total number of levels in the hierarchy 200. Each level can have a level identifier such as a number, a title, or a character string. The management service can identify a level for each user from the hierarchy 200 and associate them in the enterprise map 184. The management service 120 can use the hierarchy data 142, including the hierarchy 200, subordinate data, and user data to generate an enterprise map 184. The enterprise map 184 can include a table or a list of users including corresponding email addresses and a corresponding level. The enterprise map 184 can also include a user identifier for each user. In some cases, an enterprise map 184 can be generated for a particular client device 109 or a user associated with the particular client device 109, and can include branch information for only the branch associated with the user of the particular client device 109. In other examples, the enterprise map 184 can include branch information for all users in the enterprise map 184, or for none of the users in the enterprise map 184.

In step 321, the management service 120 can send the enterprise map 184 to the client device 109. For example, the command queue of the management service 120 can have a command that instructs the management application 169 to cause the client device 109 to obtain the enterprise map 184 through a URL, or obtain a client application 166 that includes the enterprise map 184. In some cases, the management service 120 can have a command that causes a client application 166 to be updated to include the enterprise map 184.

Figure 4:
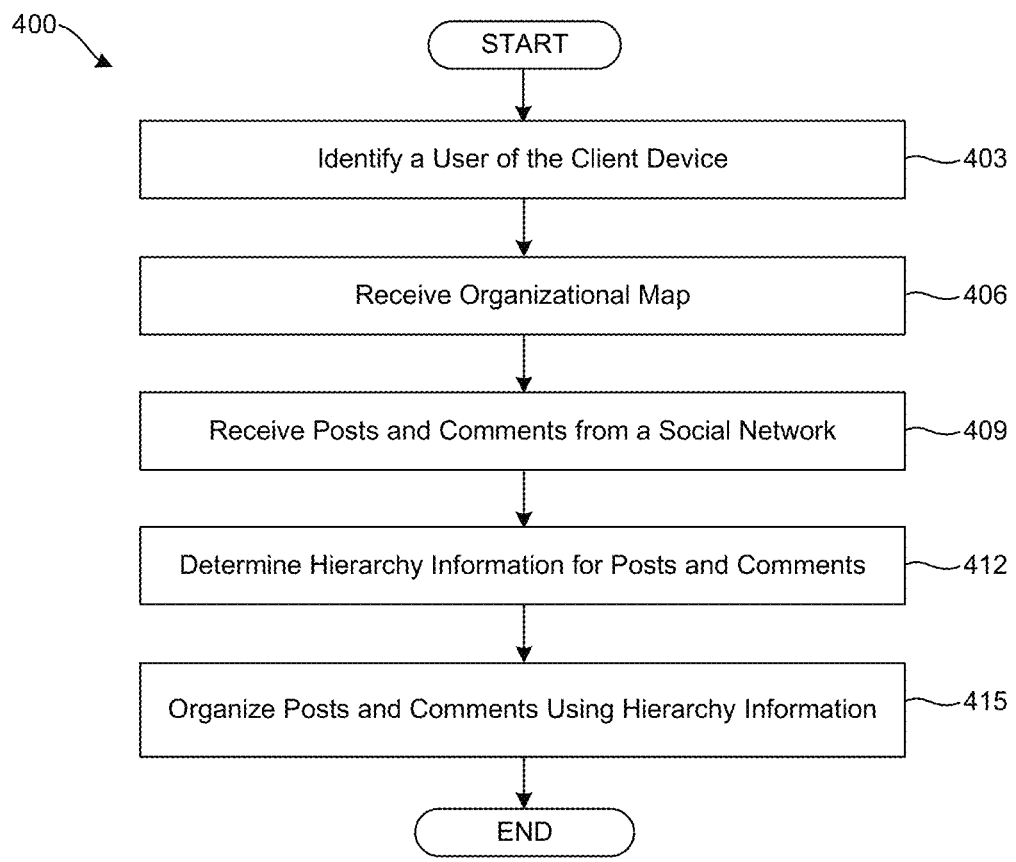

FIG. 4 shows an example flowchart 400 illustrating steps that can be performed by a social application 181 executed on the client device 109. While the steps of the flowchart are discussed as being performed by the social application 181, in other embodiments another client application 166, such as the browser application 172 can access a social media network through a network site or a web application.

In step 403, social application 181 can determine a user associated with the client device 109. For example, the social application 181 can use credentials that are entered through the operating system 160, the social application 181, the management application 169, or another application 166 to determine a user of the client device 109. Alternatively, the client device 109 can receive device data 135 from the management service 120 that identifies the user associated with the device 109. The user associated with the client device 109 can be referred to as a client user. The client user can be associated with a client user identifier, and/or an email address.

In step 406, social application 181 can receive an enterprise map 184. For example, the management application 169 can cause the client device 109 to obtain the enterprise map 184 through a URL, or obtain a client application 166 such as the social application 181 that includes the enterprise map 184. The social application 181 can also be updated to a version that includes the enterprise map 184. In some cases, the enterprise map 184 can be separate from the social application 181 and can be accessed by the various client applications 166, including the social application 181. The management service 120 can also store and provide remote access to the enterprise map 184 rather than storing the enterprise map 184 on the client device 109. In that situation, the social application 181 can access the enterprise map 184 remotely. The social application 181 can determine a level associated with the client user by identifying the level from the enterprise map 184.

In step 409, the social application 181 can receive posts from a social media network. The social media network can be provided by the management service 120. In some situations, the social media network can be provided by another service. Each post in the social media network can include a user identifier or a name that identifies a user that submitted the post. In some cases, each post can include a time and/or a date that the post was submitted. The social media network can provide the posts in a particular order, for example, chronologically or another order. A number of such posts can be received from the social media network.

In step 412, the social application 181 can determine hierarchy information associated with each post and comment. The hierarchy information can be determined using the enterprise map 184. The social application 181 can identify hierarchy information for the post by searching the enterprise map 184 for the user identifier or the name associated with the post. The hierarchy information for the post can include a level associated with the user identifier, which can be referred to as a post level. The hierarchy information for the post can also include branch information, such as whether the user identifier associated with the post is in a branch associated with the client user. Each comment can similarly be associated with a user identifier or a name that identifies a user that submitted the comment. Accordingly, the social application 181 can identify hierarchy information (e.g., comment level) for the comment by searching the enterprise map 184 for the user identifier or the name associated with the comment.

In step 415, the social application 181 can organize the posts and comments using hierarchy information. The social application 181 can show or hide posts and comments relative to a particular level. For example, the social application can hide all posts and comments from users under level three. The social application 181 can show or hide posts and comments in relation the client user level. For example, a client user can be level four and can choose to hide all posts greater than one level above and/or below the client user level. In this case, the social application 181 can show posts from users at levels three, four, and five. The social application 181 can also hide comments and posts from users in a different branch than the user of the client device 109. Multiple such rules can be active at the same time. While posts and comments handled similarly, comments can be handled differently from posts. For example, posts can be limited while all comments are shown.

In some examples, a post can be promoted and/or demoted in a list of posts using the post's relationship to a particular level or using its relationship to a level of the client user. A comment can be promoted and/or demoted in a list of comments using the comment's relationship to a particular level or using its relationship to a level of the client user. Posts and comments can be promoted towards a top of a list or demoted towards a bottom of the list based on a number of factors. The factors can include a relationship to a particular level, a relationship to a level of the client user, a time of submission, and a measure of interaction between the client user and the user that submitted the post.

The social application 181 can also categorize posts and comments. A category can be defined using a relationship to a particular level or using a relationship to a level of the user of the client device 109. A number of categories can be defined. For example, a first category can be defined to include posts that are more than one level over the client user's level (e.g., post level>client user level+1). A second category can include all posts that are from a level of the client user's direct superior (e.g., post level=client user level+1). A third category can include all posts that are from the client user's level and below (e.g., post level≤client user level). A fourth category can include all posts to which no post level can be identified, such as when the name or user identifier associated with the post cannot be found in the enterprise map 184. Such categories can be selectable through the user interface to show or hide posts and comments in each category. Where branch information is provided, a category can be defined that includes all posts and comments from the client user's branch. Subcategories can be defined in similar fashion. Accordingly, the social application 181 can categorize comments and/or posts and display a title, color code, icon, and image in association with such a category. Category definitions, color codes, titles, images, and icons can be assigned by the client user, an administrator, or a default setting.

Figure 5:
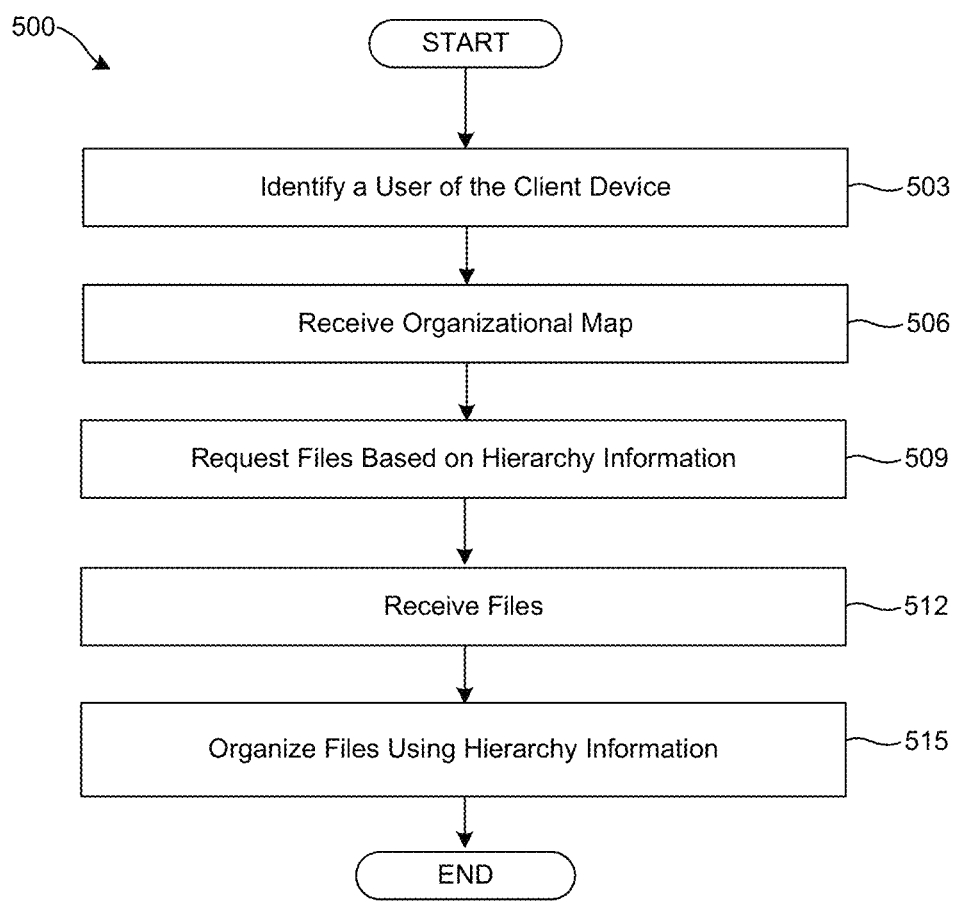

FIG. 5 shows an example flowchart 500 illustrating steps that can be performed by a locker application 178 executed on the client device 109. While the steps of the flowchart 500 are discussed as being performed by the locker application 178, in other embodiments another client application 166, such as the browser application 172, can access a social media network through a network site or a web application.

In step 503, locker application 178 can determine a user associated with the client device 109. For example, the locker application 178 can use credentials entered through the operating system 160, the locker application 178, the management application 169, or another application 166 to determine a user of the client device 109. Alternatively, the client device 109 can receive device data 135 from the management service 120 that identifies the user associated with the device 109 (i.e., client user).

In step 506, locker application 178 can receive an enterprise map 184. For example, the management application 169 can cause the client device 109 to obtain the enterprise map 184 through a URL, or obtain the locker application 178 including the enterprise map 184. The locker application 178 can also be updated to a version that includes the enterprise map 184. In some cases, the enterprise map 184 can be separate from the locker application 178 in the data store 163. The management service 120 can also store and provide remote access to the enterprise map 184 rather than storing the enterprise map 184 on the client device 109. In that situation, the locker application 178 can access the enterprise map 184 remotely. The locker application 178 can determine a level associated with the client user by identifying a level in the enterprise map 184.

In step 509, the locker application 178 can request files based on hierarchy information identified in the enterprise map 184. The locker application 178 can request only files that are uploaded or updated by users based on their relation to a particular level or their relation to a level of the client user. In one example, the locker application 178 can identify a subset of users in the enterprise map 184 having a specified relation to a particular level or their relation to a level of the client user. The locker application 178 can transmit a request that includes user identifiers for the subset of users to the management service 120. The management service 120 can direct the locker application 178 to access files that have been uploaded or updated by the subset of users identified in the request.

In step 512, the locker application 178 can receive the files. In some examples, the locker application 178 can also request and receive files that are sent to the client user or to a category of users including the client user, as well as navigate files through the user interface of the locker application 178. The locker application 178 can identify hierarchy information for each file by searching the enterprise map 184 for a user identifier associated with the file. The hierarchy information for the file can include a level associated with the user identifier, which can be referred to as a file level. The hierarchy information for the file can also include branch information, such as whether the user identifier associated with the file is in a branch associated with the client user. Accordingly, the locker application 178 can identify hierarchy information (e.g., file level) for the file by searching the enterprise map 184 for the user identifier or the name associated with the file. User identifiers can be associated with actions performed on the file including updating the file and uploading the file.

In step 515, the locker application 178 can organize the files using hierarchy information. The locker application 178 can show or hide files relative to a particular level. For example, the locker application 178 can hide all files from users over level five, regardless of the client user level or when a client user level is not determined. The locker application 178 can show or hide files in relation the client user level. For example, a client user can be level three and can choose to hide all files greater than one level above and/or below the client user level. The locker application 178 can also hide files uploaded or updated by users in a different branch than the client user. Multiple rules can be active at the same time.

The locker application 178 can also categorize each file using its relationship to a particular level or using its relationship to a level of the user of the client device 109. A number of categories can be defined. For example, a first category can be defined to include all files that are more than one level over the client user level and more than one level under the client user level (e.g., including file level>client user level+1 AND file level<client user level−1). A second category can include all files that are from a level of the client user's direct subordinates (e.g., post level=client user level−1). Such categories can be selectable through the user interface to show or hide files in each category. Where branch information is provided, a category can be defined that includes all files from the client user's branch, or a level-based subset of Subcategories can be defined in similar fashion. Accordingly, the locker application 178 can categorize files and display a title, color code, icon, and image in association with such a category. Category definitions, color codes, titles, images, and icons can be assigned by the client user, by an administrator, or by a default setting.

Figure 6:
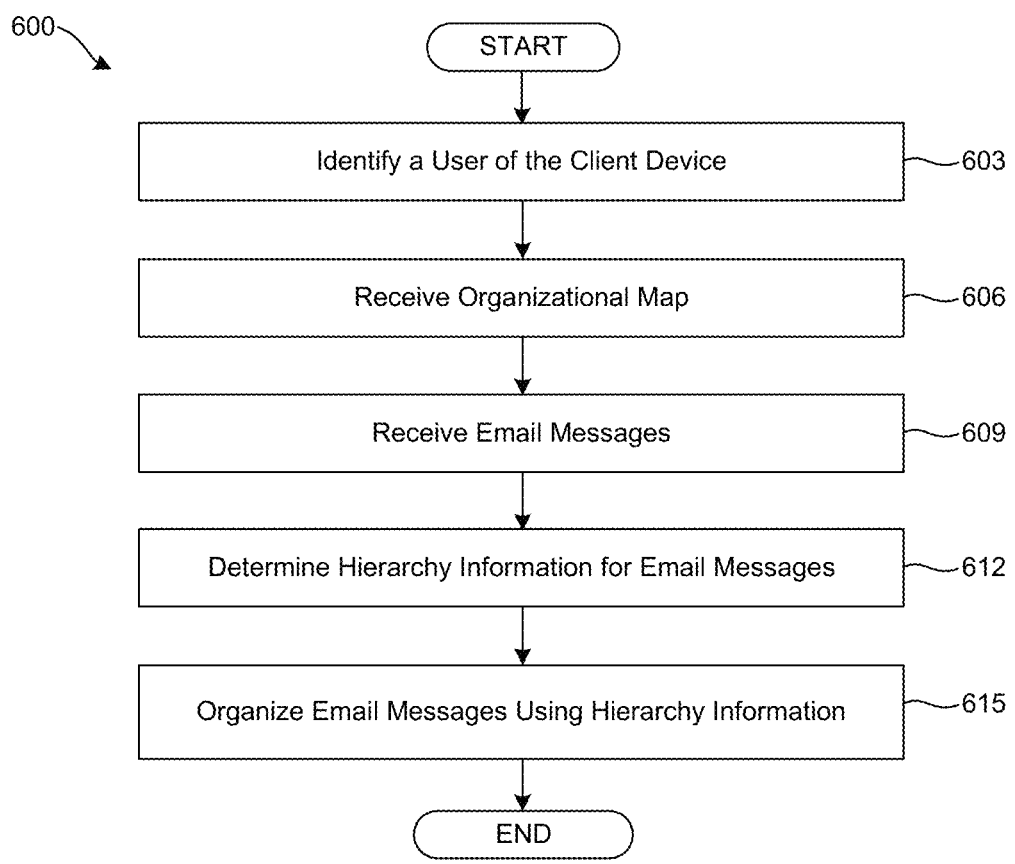

FIG. 6 shows an example flowchart 600 illustrating steps that can be performed by a email application 175 executed on the client device 109. While the steps of the flowchart 600 are discussed as being performed by the email application 175, in other embodiments another client application 166 such as the browser application 172 can access email messages through a network site or a web application.

In step 603, email application 175 can determine a user associated with the client device 109. For example, the email application 175 can use credentials that are entered through the operating system 160, the email application 175, the management application 169, or another application 166 to determine a user of the client device 109. Alternatively, the client device 109 can receive device data 135 from the management service 120 that identifies the client user.

In step 606, email application 175 can receive an enterprise map 184. For example, the management application 169 can cause the client device 109 to obtain the enterprise map 184 through a URL, or obtain the email application 175 including the enterprise map 184. The email application 175 can also be updated to a version that includes the enterprise map 184. In some cases, the enterprise map 184 can be separate from the email application 175. The management service 120 can also store and provide remote access to the enterprise map 184 rather than storing the enterprise map 184 on the client device 109. In that situation, the email application 175 can access the enterprise map 184 remotely. The email application 175 can determine a level associated with the client user by searching the enterprise map 184 for a user identifier or an email address associated with the client user.

In step 609, the email application 175 can receive email messages. The email messages can be stored by the management service 120 or another service. Each email message can identify a source email address or can include a user identifier or a name that identifies a user that sent the email message. In some cases, each email message can include a time and/or a date that the email message was sent.

In step 612, the email application 175 can determine hierarchy information associated with each email message. The hierarchy information can be determined using the enterprise map 184. The email application 175 can identify hierarchy information for the email message by searching the enterprise map 184 for the email address associated with the email message. The hierarchy information for the email message can include a level associated with the email address of the sender, which can be referred to as an email level. The hierarchy information for the email message can also include branch information, such as whether the email address that sent the email message is in a branch associated with the client user. Accordingly, the email application 175 can identify hierarchy information (e.g., email level) for each email message by searching the enterprise map 184 for the email address, user identifier, or name associated with each email message.

In step 615, the email application 175 can organize the email messages using hierarchy information. The email application 175 can show or hide email messages relative to a particular level. For example, the email application 175 can hide all email messages from users under level two, regardless of the client user level (e.g., email level<2). The email application 175 can show or hide email messages in relation the client user level. For example, a client user can be level two and can choose to hide all email messages greater than two levels above and/or below the client user level (e.g., email level>client user level+2). The email application 175 can also show or hide email messages from users in a different branch than the client user. Multiple such rules can be active at the same time.

The email application 175 can also categorize email messages. One category or a number of categories can be defined using a relationship to a particular level or using a relationship to a client user level. For example, a first category can be defined to include email messages that are more than one level over the client user's level (e.g., email level>client user level+1). A second category can include all email messages that are from a level of the client user's direct superior (e.g., email level=client user level+1). A third category can include all email messages that are from the client user's level and below (e.g., post level≤client user level). A fourth category can include all email messages to which no email level can be identified, such as when the email address that sent the email message cannot be found in the enterprise map 184. Such categories can be selectable through the user interface to show or hide the email messages in each category upon selection. Where branch information is provided, a category can be defined that includes all email messages from the client user's branch. Subcategories can also be defined. Accordingly, the email application 175 can categorize email messages and display a title, color code, icon, and image in association with such a category. Category definitions, color codes, titles, images, and icons can be assigned by the client user, an administrator, or a default setting.

With reference to FIG. 7A, shown is an example illustration of a client device 109 executing an email application 175 to render a user interface 703. The user interface 703 shows email categories 706A-E. Each of the email categories 706A-E can be rendered having an associated monochromatic shade. Color can also be used and each of the email categories 706A-E can have a respective color or shade of a color. In other cases, all or some of the email categories 706A-E can have the same color or shade.

Each of the email categories 706A-E can also have a title. The email category 706A can have a title "Level 5+." The email category 706A can be associated with users having a level that is level five or greater, as identified using the enterprise map 184. As discussed above, the email category 706A can be a category that is defined relative the client user. In one example, the client user can be level four. Email messages from users that are levels five and over can be from superiors of the client user, and can be considered more relevant or more important than email messages from other users, and can be listed higher or can have a particular color in the user interface 703. The title "Level 5+" can be a default title or a descriptive or fanciful title, such as "The Bosses," and can be edited or replaced with any title by the client user or an administrator. Icons or images can also be associated with each email category 706A-E. The email category 706A shows an icon with a number "2" that can indicate a number of emails or a number of new emails in the email category 706A.

The email category 706A can be shown as opened with email messages 709A and 709B as previews that can be selected to open the email message. A button or user interface element can be provided in the user interface 703 that, once activated, minimizes or collapses the opened category 706A when selected by a user of the client device 109. The button or user interface element can be an upward pointing chevron, a word, an image, or another shape. The email message can be shown as a preview or in full. The email message 709A can show that it is from "CEO@company.com." The email application 175 can search the enterprise map 184 for "CEO@company.com" and identify that this email address is associated with level seven of the hierarchy 200. In some cases, the email application 175 can also identify that the email address is in a branch associated with the client user. Accordingly, the email application 175 can organize the email message 709A in the corresponding email category 706A. Email messages of level seven can have a particular color associated with them. As shown, the email message 709A can have a color that can be different from the corresponding email category 706A in which it is categorized. A color bar of the email message 709A is shown across a left side. The email message 709A can alternatively be filled in the associated color, or can have a color bar across its top or across another side. A color bar can also be another shape, or a colored or shaded icon or image.

The email message 709B can show that it is from "PM206@company.com." The email application 175 can search the enterprise map 184 for "PM206@company.com" and identify that this email address is associated with level five in the hierarchy 200, as well as assign email level five to the email message. In some cases, the email application 175 can also identify that the email address is in a branch associated with the client user. Accordingly, the email application 175 can organize the email message 709B in the corresponding email category 706A. While email level is discussed as determined using the email address associated with the email message (e.g., in an email header). The email level can be determined by a username or a keyword in a body or a header of the email message, or other information in the email message can determine the level. Accordingly, the email application 175 can parse the email message to identify relevant information including keyword(s), username(s), name(s), and email address(es) in a body or a header of the email message. The email application 175 can search the enterprise map 184 using the identified information from the email message to assign an email level to the email message.

Email messages at level five can have a particular color associated with them. As shown, the email message 709B can have a color that can be the same as the corresponding email category 706A in which it is categorized. A color bar of the email message 709B is shown across a left side. The email message 709B can alternatively be filled in the associated color, or can have a color bar across its top or across another side.

Each of the email messages 709A and 709B can also have other information associated with them. The email message 709A can be sent at 2:04 PM as shown, and the email message 709B can be sent at 1:09 PM as shown. Accordingly, the email messages 709A and 709B that are categorized in category 706A can be sorted, searched, promoted or arranged in the category 706A according to or a combination of factors including time, date, and email level. The email category 706B can have a title "My Level." The title "My Level" can be a default title and can be edited or replaced with any title by the client user or an administrator. The email category 706B can have an icon with a number "3," that can indicate a number of emails or a number of new emails in the email category 706A. Another icon can be used to identify urgent or newly received emails, and can be an exclamation point as shown.

The email category 706B can be associated with email messages from users having a level that is the same as the client user level, as identified using the enterprise map 184. The email category 706B can be shown as closed. Email category 706B can be shown filled by the associated color of the category. The email category 706b can alternatively have a color bar across a top, bottom, left, or right. A button or user interface element can be provided in the user interface 703 that opens or expands the closed category 706B when selected by a user of the client device 109. The button or user interface element can be a downward pointing chevron, a word, an image, or another shape. The email application 175 can receive email messages from email address, or from particular users. The email application 175 can search the enterprise map 184 for the email addresses and users to identify that the email addresses or users are associated with level five of the hierarchy 200. In some cases, the email application 175 can also identify that the email addresses are in a branch associated with the client user. Accordingly, the email application 175 can organize the email messages under the corresponding email category 706B.

The email categories 706C-E can be similar to the email categories 706A and 706B discussed previously. The email category 706C can have a title such as "The Programmers," or another custom title. The email category 706C can include emails from level three users. In the example hierarchy, users at level three can be programmers 221, 224, 227, and 230, and emails can be identified from these users and assigned to email category 706C. The email category 706D can have a title such as "Under Level 3," and the email application 175 can assign email messages from users under level three to this category. The email category 706E can have a title "Non-Enterprise." Email messages from users that cannot be found in the enterprise map 184 can be assigned to the email category 706E.

FIG. 7B shows an example of a client device 109 executing the locker application 178 to render a user interface 723. The user interface 723 can show files 726A-D. Each of the files 726A-D can be rendered having an associated monochromatic shade. Color can also be used, and each of the files 726A-D can have a respective color or shade of a color. In other cases, all or some of the files 726A-D can have the same color or shade. A color bar can be shown across a left side of each file of the files 726A-D. Alternatively, the files 726A-D can be filled with a respective color, or the color bar can be on another side of the files 726A-D. The color can be representative of a level or a category. Files 726A-D can have a respective color that identifies the category or level. The files can also be listed with files from the most important or most relevant levels or categories at a top of the list. While not shown, files in the locker application 178 can also be separated according to category with titles as discussed in FIG. 7A with respect to the email application 175. A user of the client device can select one of the files 726A-D to preview, open, download, or otherwise access the files 726A-D through the user interface 723.

The user interface 723 of the locker application 178 can also include buttons or user interface elements that when selected cause the locker application 178 to update files that are edited by users in a particular level or category. The user interface element 729 shows "Update Files Edited by Leads," and when selected can update files that are edited by users in level four of the hierarchy 200. The user interface element 732 shows "Update Files Edited by Programmers," and when selected can update files that are edited by users in level three of the hierarchy 200.

Figure 7C:
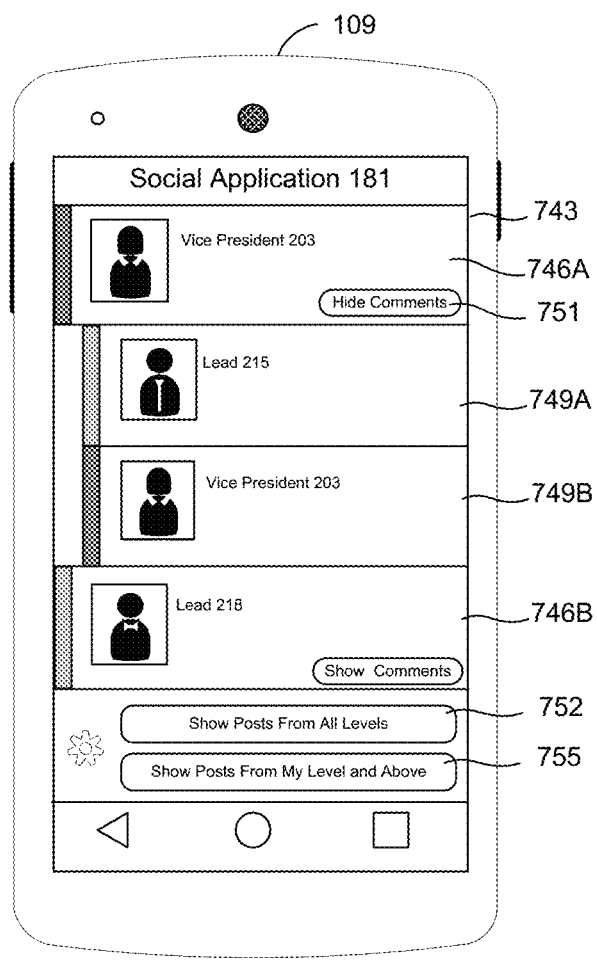

FIG. 7C shows an example of a client device 109 executing the social application 181 to render a user interface 743. The user interface 743 can show posts 746A and 746B in a list of posts of a social media network. The social application 181 can receive posts 746A and 746B from the social media network. The social media network can be provided by the management service 120 or another service. Each of the posts 746A and 746B can include a user identifier or a name that identifies a user that submitted the post.

The post 746A can be a post submitted by the Vice President 203 and can be associated with the name of the Vice President 203, an email address of the Vice President 203, or another user identifier for the Vice President 203. The social application 181 can use the name, email address or user identifier to determine a post level of the post 746A. The social application 181 can search the enterprise map 184 to identify that the Vice President 203 is level six of the hierarchy 200. The social application 181 can assign post level six to the post 746A. The user interface 743 can show the post level of the post 746A using a corresponding color, color bar, icon, or image. The social application 181 can likewise identify that the post 746B has a post level four using the enterprise map 184 and a user identifier of Lead 218 that submitted the post 746B.

The user interface 743 can also show comments 749A and 749B that are associated with the post 746A. The user interface 743 can include a button 751 that when selected causes the user interface 743 to hide or collapse comments 749A and 749B for the post 746A. Comment 749A can be associated with the name, email address, or another user identifier of the Lead 215. The social application 181 can use the name, email address or user identifier to determine a comment level of the comment 749A. The social application 181 can search the enterprise map 184 to identify that the Lead 215 is level four of the hierarchy 200. The social application 181 can assign comment level four to the comment 749A. The user interface 743 can show the comment level of the comment 749A using a corresponding color, color bar, icon, or image. The social application 181 can likewise identify that the comment 749B has a comment level six using the enterprise map 184 and a user identifier of Vice President 203 that submitted the comment 749B.

The social application 181 can also promote and/or demote posts 746A and 746B in the list of posts based on a number of factors. The factors can include a relation to a particular level, a relation to a level of the client user, a time of submission, and a measure of interaction between the client user and the user that submitted the post. The social application 181 can likewise promote and/or demote comments 749A and 749B in the list of comments for the post 746A.

The user interface 743 can also have a button 752 stating "Show Posts From All Levels." When selected, the button 752 can cause the user interface 743 to show posts from all levels. The user interface 743 can also have a button 755 stating "Show Posts From My Level and Above." When selected, the button 755 can cause the user interface 743 to show posts having post levels that are equal to and greater than the client user level.

The management service 120 can provide the email application 175, the locker application 178, the social application 181, and other enterprise applications of the client applications 166. In some cases, colors, titles, images, and icons can be consistent throughout the various enterprise applications. For example, the same color can be associated with a defined category and can be used in each of the enterprise applications. In other cases, categories can be defined for each application individually, and respective colors, titles, images, and icons can be assigned.

The client devices 109, or devices comprising the management system 106 and the directory system 107, can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by the client application 166 or another application can be rendered. In some examples, the user interface can be generated with user interface data provided by the management system 106. The client device 109 can also include one or more input/output devices that can include, for example, a capacitive touchscreen or other type of touch input device, fingerprint reader, or keyboard.

Although the management service 120, client applications 166, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   a client device; and
   program instructions executable in the client device, wherein the program instructions, when executed by a processor, cause the client device to at least:
   receive an enterprise map comprising a plurality of user identifiers, a respective user identifier being associated with a corresponding hierarchy level of a plurality of hierarchy levels of an enterprise hierarchy;
   receive enterprise content comprising a plurality of enterprise content items, wherein an enterprise content item specifies a user identifier, wherein the user identifier is one of the plurality of user identifiers;
   determine, based on the user identifier specified by the enterprise content item, that the enterprise content item is associated with a particular hierarchy-based category of a plurality of hierarchy-based categories, the particular hierarchy-based category indicating a position of a hierarchy level of the user identifier of the enterprise content item relative to a client hierarchy level of a client user identifier associated with the client device; and
   generate, on the client device, a user interface that renders a first subset of the plurality of enterprise content items, and hides a second subset of the plurality of enterprise content items based on a rule that causes the user interface to hide enterprise content items that are identified to be at least a particular number of levels from the client hierarchy level, wherein the enterprise content item is shown using a particular shade assigned to the particular hierarchy-based category and indicates the position of the hierarchy level relative to a client hierarchy level in the enterprise hierarchy.

2. The system of claim 1, wherein the particular shade comprises: a monochromatic shade, or a shade of a color.

3. The system of claim 1, wherein the program instructions, when executed by the processor, further cause the client device to at least:
   receive social media network data comprising the enterprise content item, wherein the user interface comprises a social media user interface.

4. The system of claim 1, wherein the program instructions, when executed by the processor, further cause the client device to at least:
   receive an email message comprising the enterprise content item, wherein the user interface comprises an email user interface.

5. The system of claim 1, wherein the program instructions, when executed by the processor, further cause the client device to at least:
   transmit a request for files, wherein the request for files comprises the client hierarchy level associated with the client device; and
   receive a file based on the client hierarchy level, the file comprising the enterprise content item, wherein the user interface organizes shared files associated with an enterprise.

6. The system of claim 1, wherein the plurality of user identifiers comprise at least one of: a plurality of email addresses, and a plurality of user accounts with an enterprise.

7. The system of claim 1, wherein the program instructions, when executed by the processor, further cause the client device to at least:
   obtain a selection of a user interface element that updates the user interface to show the second subset of the plurality of enterprise content items.

8. A computer-implemented method, comprising:
   receiving an enterprise map comprising a plurality of user identifiers, a respective user identifier being associated with a corresponding hierarchy level of a plurality of hierarchy levels of an enterprise hierarchy;
   receiving enterprise content comprising a plurality of enterprise content items, wherein an enterprise content item specifies a user identifier, wherein the user identifier is one of the plurality of user identifiers;

determining, based on the user identifier specified by the enterprise content item, that the enterprise content item is associated with a particular hierarchy-based category of a plurality of hierarchy-based categories, the particular hierarchy-based category indicating a position of a hierarchy level of the user identifier of the enterprise content item relative to a client hierarchy level of a client user identifier associated with a client device; and generating, on the client device, a user interface that renders a first subset of the plurality of enterprise content items, and hides a second subset of the plurality of enterprise content items based on a rule that causes the user interface to hide enterprise content items that are identified to be at least a particular number of levels from the client hierarchy level, wherein the enterprise content item is shown using a particular shade assigned to the particular hierarchy-based category and indicates the position of the hierarchy level relative to a client hierarchy level in the enterprise hierarchy.

9. The computer-implemented method of claim 8, wherein the particular shade comprises a shade of a color.

10. The computer-implemented method of claim 8, further comprising:
receiving social media network data comprising a post or a comment, the social media network data comprising the enterprise content item, wherein the user interface comprises a social media user interface.

11. The computer-implemented method of claim 8, further comprising:
receiving an email message, the email message comprising the enterprise content item, wherein the user interface comprises an email user interface.

12. The computer-implemented method of claim 8, further comprising:
transmitting a request for files, wherein the request for files comprises the client hierarchy level associated with the client device; and
receiving a file based on the client hierarchy level, the file comprising the enterprise content item, wherein the user interface organizes shared files associated with an enterprise.

13. The computer-implemented method of claim 8, wherein the plurality of user identifiers comprise at least one of: a plurality of email addresses, and a plurality of user accounts with an enterprise.

14. The computer-implemented method of claim 8, further comprising:
obtaining a selection of a user interface element that updates the user interface to show the second subset of the plurality of enterprise content items.

15. A non-transitory computer-readable medium embodying program instructions executable in a client device, wherein the program instructions, when executed by a processor, cause the client device to at least:

receive an enterprise map comprising a plurality of user identifiers, a respective user identifier being associated with a corresponding hierarchy level of a plurality of hierarchy levels of an enterprise hierarchy;

receive enterprise content comprising a plurality of enterprise content items, wherein an enterprise content item specifies a user identifier, wherein the user identifier is one of the plurality of user identifiers;

determine, based on the user identifier specified by the enterprise content item, that the enterprise content item is associated with a particular hierarchy-based category of a plurality of hierarchy-based categories, the particular hierarchy-based category indicating a position of a hierarchy level of the user identifier of the enterprise content item relative to a client hierarchy level of a client user identifier associated with the client device; and generate, on the client device, a user interface that renders a first subset of the plurality of enterprise content items, and hides a second subset of the plurality of enterprise content items based on a rule that causes the user interface to hide enterprise content items that are identified to be at least a particular number of levels from the client hierarchy level.

16. The non-transitory computer-readable medium of claim 15, wherein a particular shade comprises: a monochromatic shade, or a shade of a color.

17. The non-transitory computer-readable medium of claim 15, wherein the program instructions, when executed by the processor, further cause the client device to at least:
receive social media network data comprising a post or a comment, the social media network data comprising the enterprise content item, wherein the user interface comprises a social media user interface.

18. The non-transitory computer-readable medium of claim 15, wherein the program instructions, when executed by the processor, further cause the client device to at least:
receive an email message, the email message comprising the enterprise content item, wherein the user interface comprises an email user interface.

19. The non-transitory computer-readable medium of claim 15, wherein the program instructions, when executed by the processor, further cause the client device to at least:
transmit a request for files, wherein the request for files comprises the client hierarchy level associated with the client device; and
receive a file based on the client hierarchy level, the file comprising the enterprise content item, wherein the user interface organizes shared files associated with an enterprise.

20. The non-transitory computer-readable medium of claim 15, wherein the plurality of user identifiers comprise at least one of: a plurality of email addresses, and a plurality of user accounts with an enterprise.

* * * * *